Patented Dec. 27, 1949

2,492,512

UNITED STATES PATENT OFFICE 2,492,512

PLASTICIZED COMPOSITION OF POLYVINYL ACETAL

Samuel Zweig, Milwaukee, Wis., assignor to Milprint, Inc., Milwaukee, Wis., a corporation of Delaware No Drawing. Application January 26, 1946,
Serial No. 643,755

1 Claim. (Cl. 260—23)

This invention relates to a composition of matter, more particularly to a composition which may be applied as a coating from a molten state to a flexible sheet such as paper, metal foil, regenerated cellulose, etc., to produce a composite sheet which can be bonded to itself or other surfaces by means of heat and pressure. Such a composite sheet is very useful in package production, since it eliminates the use of tacky glues, which in general are difficult to handle and frequently do not produce a satisfactory bond.

The invention further consists in the thermoplastic coating composition hereinafter described and more particularly defined by the claim at the conclusion hereof.

The composition of this invention comprises a film forming polymer of a polyvinyl acetal, a wax-like component and either a liquid plasticizer or a resinous component or both.

The film forming high molecular weight polymers of the general class known as polyvinyl acetals are attained by reacting, in the presence of an acid hydrolizing agent such as hydrochloric acid or zinc chloride, polyvinyl acetate with an aldehyde such as formaldehyde, acetaldehyde or butyraldehyde. The reaction consists of hydrolysis of the polyvinyl acetate to polyvinyl alcohol and condensation between the hydroxyl group of the alcohol and oxygen of the aldehyde with the elimination of water, giving an acetal group of the general formulae:

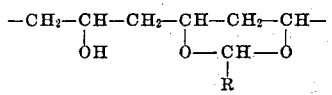

The low hydroxy type of the polyvinyl acetals where from 70 to 95% of the hydroxyl groups are condensed with the aldehyde is preferred. The polyvinyl acetal particularly preferred of those noted above is that compound made with butyraldehyde and containing from 8 to 15% residual free hydroxy groups.

The proportion of film forming polyvinyl acetal in the total composition may be from 5 to 30% by weight.

The wax-like component may be selected from a group of aliphatic fatty acid esters in which either the acid or alcohol component or both contain more than twelve carbon atoms and in which either the alcohol or acid component or both contain one or two free hydroxy groups. Examples of such components are glyceryl monostearate, glyceryl distearate, ethylene glycol monostearate, diethylene glycol monostearate, triethylene glycol, triethylene glycol monostearate, hydrogenated castor oil (composed chiefly of glyceryl ester of hydroxystearic acid), ethylene glycol monohydroxy-stearate, and other similar compounds. This wax-like component may also be selected from the group of aliphatic fatty acids such as stearic, oleic, palmitic acids with fourteen or more carbon atoms in the molecule, and alcohols with fourteen or more carbon atoms in the molecule such as cetyl alcohol, tetradecyl alcohol, carnaubyl alcohol, amides with fourteen or more carbon atoms derived from aliphatic fatty acids such as stearic, oleic, palmitic acids mentioned above, and aliphatic ketones containing twenty-eight or more carbon atoms derived from the fatty acids above mentioned and their homologues.

Any one of these wax-like compounds or mixtures of these may be selected as the wax component. Modifying waxes in proportion less than 50% of the wax component may be added. These modifying waxes may be paraffin wax, microcrystalline waxes, beeswax, carnauba wax, and similar products.

The total wax component may constitute from 25 to 85% by weight of composition.

To the mixture of film forming polyvinyl acetal and the wax-like component may be added a liquid plasticizer or a resinous substance or both.

The plasticizer, when used, may be selected from a group of plasticizers commonly used with polyvinyl acetals and other polyvinyl compounds. These include castor oil, ricinoleate, tricresyl phosphate, triethylene glycol, polyethylene glycol hexoate, diethylene glycol phthalate, butyl phthalyl butyl glycolate, and others.

The ratio of plasticizer to other ingredients in this composition may be from 0 to 25% by weight.

The resinous substances, when used, may be selected from a large group of natural and synthetic resins, such as rosin, hydrogenated rosin, "ester" gums (glyceryl or other polyhydric ester of rosin acid), coumarone-indene resins attained by polymerization of coal tar naphthas having a boiling range of 150–200° C. produced in the coking of coal, phenol formaldehyde 100% phenolic resins, rosin modified maleic esters of glycerol or other polyhydric alcohol, and similar resins. One or more of these resinous substances may be used and the resinous component may comprise from 0 to 50% by weight of the composition.

The following examples give specific formula that may be used in practising the invention:

Example 1

|  | Parts |
|---|---|
| Polyvinyl butyral (8 to 15% hydroxy content) | 2 |
| Hydrogenated castor oil | 10 |
| Hydrogenated rosin | 3 |

Example 2

|  | Parts |
|---|---|
| Polyvinyl butyral (8 to 15% hydroxy content) | 6 |
| Hydrogenated castor oil | 50 |
| Hydrogenated rosin | 20 |
| Paraffin wax (134° F. melting point) | 3 |

Example 3

| | Parts |
|---|---|
| Polyvinyl butyral (8 to 15% hydroxy content) | 20 |
| Hydrogenated castor oil | 85 |
| Hydrogenated rosin | 20 |
| Ester gum (glyceryl ester of rosin) | 18 |

Example 4

| | Parts |
|---|---|
| Polyvinyl butyral (8 to 15% hydroxy content) | 20 |
| Hydrogenated castor oil | 70 |
| Castor oil | 2 |
| Hydrogenated rosin | 20 |

Example 5

| | Parts |
|---|---|
| Polyvinyl butyral (8 to 15% hydroxy content) | 20 |
| Hydrogenated castor oil | 20 |
| Castor oil | 20 |

Example 6

| | Parts |
|---|---|
| Polyvinyl butyral (8 to 15% hydroxy content) | 5.0 |
| Hydrogenated castor oil | 17.5 |
| Diethylene glycol phthalate | 5.0 |
| Glyceryl ester of hydrogenated rosin | 4.5 |

Example 7

| | Parts |
|---|---|
| Polyvinyl butyral (8 to 15% hydroxy content) | 5.0 |
| Hydrogenated castor oil | 17.5 |
| Triethylene glycol | 2.5 |
| Glyceryl ester of heat polymerized rosin | 8.0 |

Example 8

| | Parts |
|---|---|
| Polyvinyl butyral (8 to 15% hydroxy content) | 12.5 |
| Cetyl alcohol | 46.0 |
| Glyceryl ester of hydrogenated rosin | 15.0 |

Example 9

| | Parts |
|---|---|
| Polyvinyl butyral (8 to 15% hydroxy content) | 12.5 |
| Diethylene glycol monostearate | 10.0 |
| Hydrogenated castor oil | 5.0 |
| Glyceryl ester of heat polymerized rosin | 22.0 |
| Glyceryl ester of hydrogenated rosin | 16.5 |

Example 10

| | Parts |
|---|---|
| Polyvinyl butyral (8 to 15% hydroxy content) | 12.5 |
| Diethylene glycol monostearate | 10.0 |
| Castor oil | 5.0 |
| Hydrogenated castor oil | 35.0 |
| Glyceryl ester of hydrogenated rosin | 30.0 |

The above thermoplastic coating compositions may be applied to the entire surface of the sheet materials heretofore mentioned or to spots of the same desired to be sealed which on the suitable application of heat will be sealed together.

The specific compositions described in this specification are given as exemplificatory embodiments of the invention, and it is intended to include in the appended claim not only such specific compositions and their range of proportions, but also any equivalents and variations within the scope of this disclosure.

What I claim as my invention is:

A thermoplastic coating composition comprising 5 to 30% by weight of a polyvinyl acetal having 8 to 15% hydroxy content, 25 to 85% by weight of hydrogenated castor oil, and 2 to 25% by weight of castor oil.

SAMUEL ZWEIG.

REFERENCES CITED

The following references are of record in the file of this patent:

UNITED STATES PATENTS

| Number | Name | Date |
|---|---|---|
| 2,056,796 | Macht | Oct. 6, 1936 |
| 2,290,180 | Hershberger | July 21, 1942 |
| 2,348,756 | Ryan | May 16, 1944 |
| 2,442,018 | Quarles | May 25, 1948 |

FOREIGN PATENTS

| Number | Country | Date |
|---|---|---|
| 410,506 | Great Britain | May 14, 1934 |
| 546,562 | Great Britain | July 20, 1942 |